Jan. 23, 1962 G. B. HILL 3,017,736
DOUBLE SICKLE MOWER CONSTRUCTION
Original Filed April 13, 1955 4 Sheets-Sheet 1
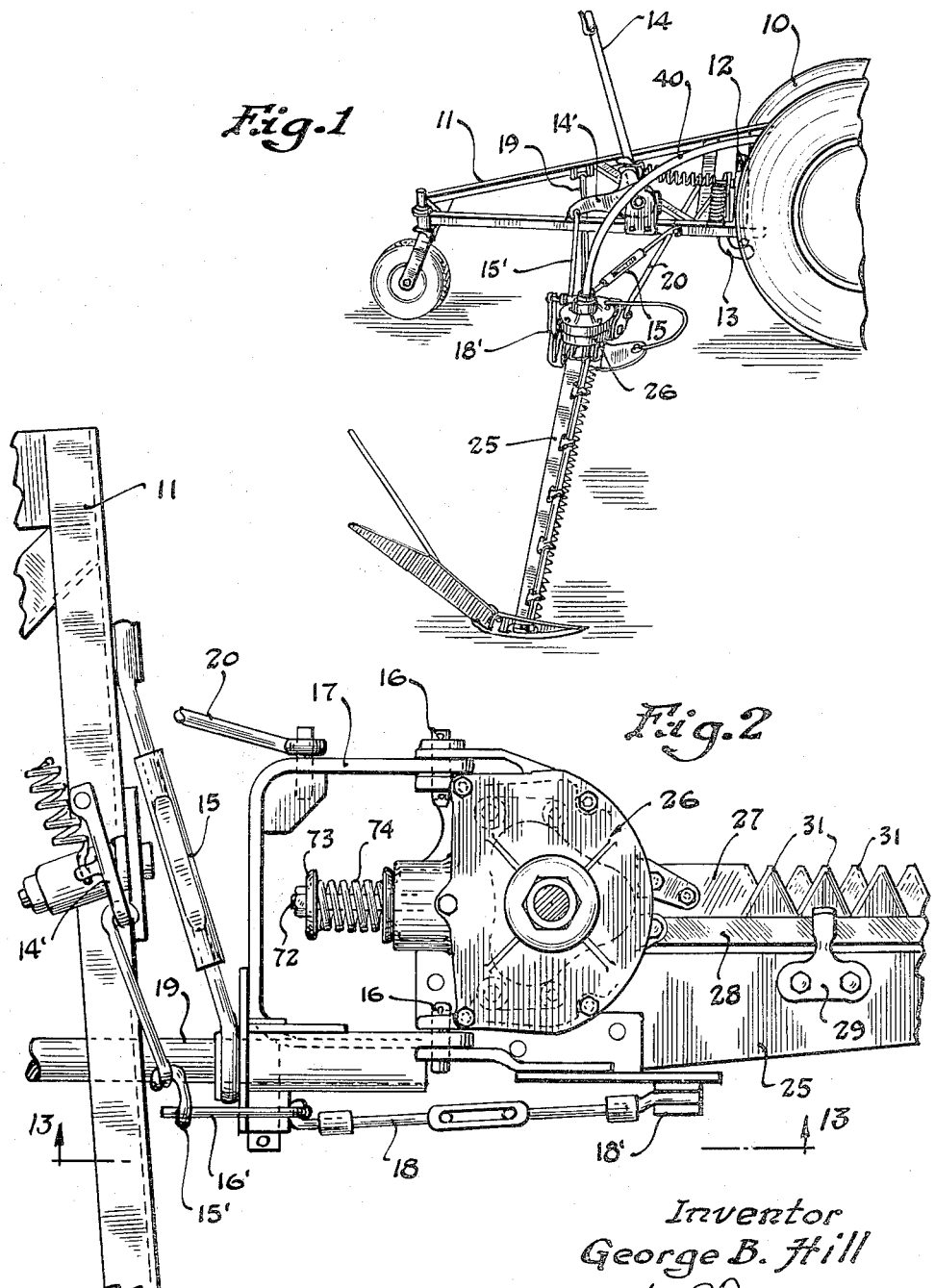
Inventor
George B. Hill
By Allan R. Redrow
Attorney Jan. 23, 1962 G. B. HILL 3,017,736
DOUBLE SICKLE MOWER CONSTRUCTION
Original Filed April 13, 1955 4 Sheets-Sheet 2
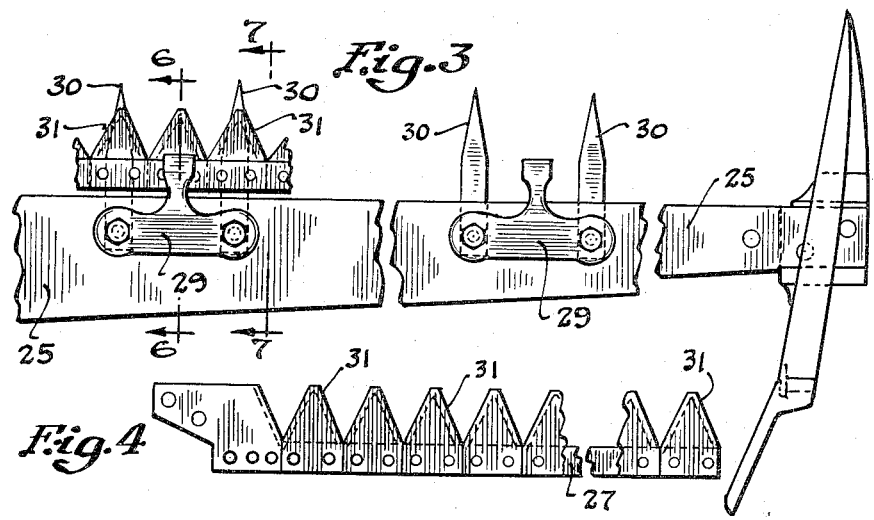
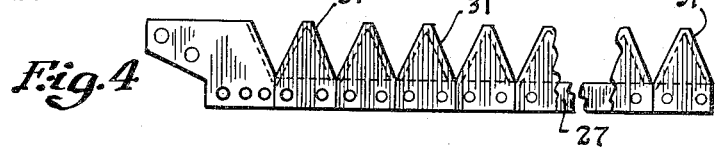
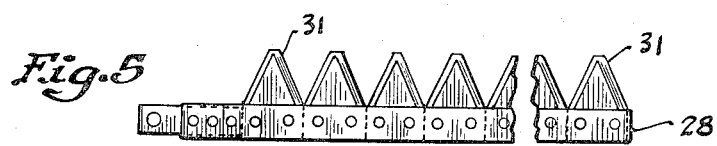
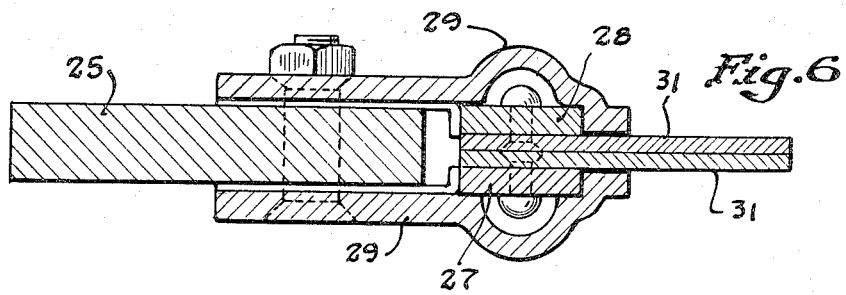
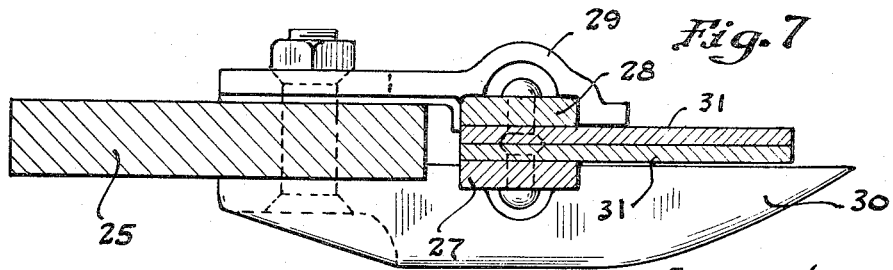
Inventor
George B. Hill
By Allan R. Redrow
Attorney

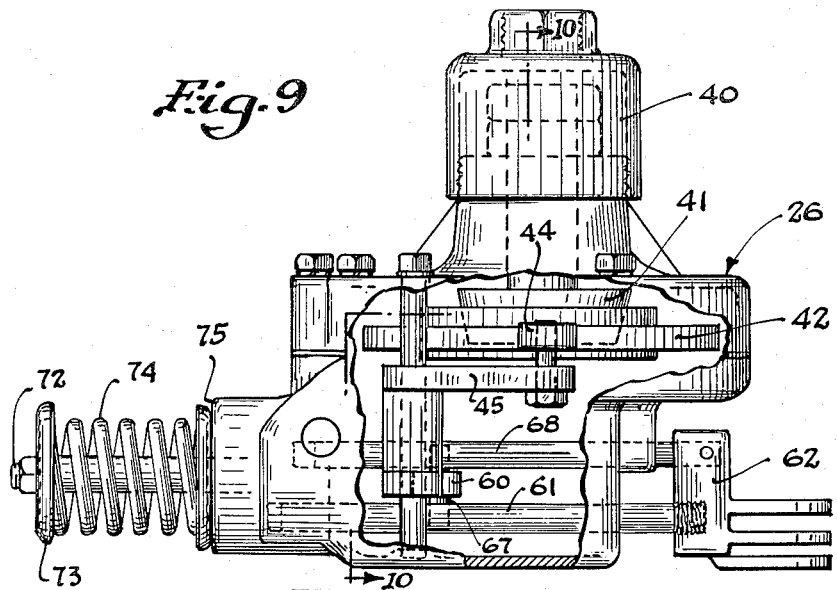
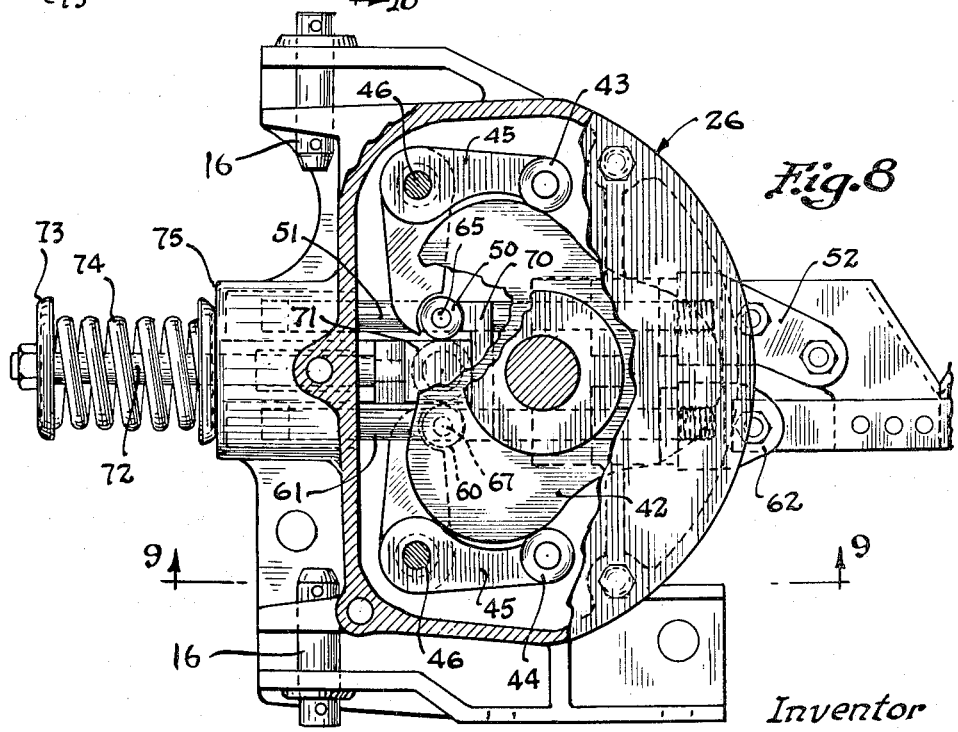

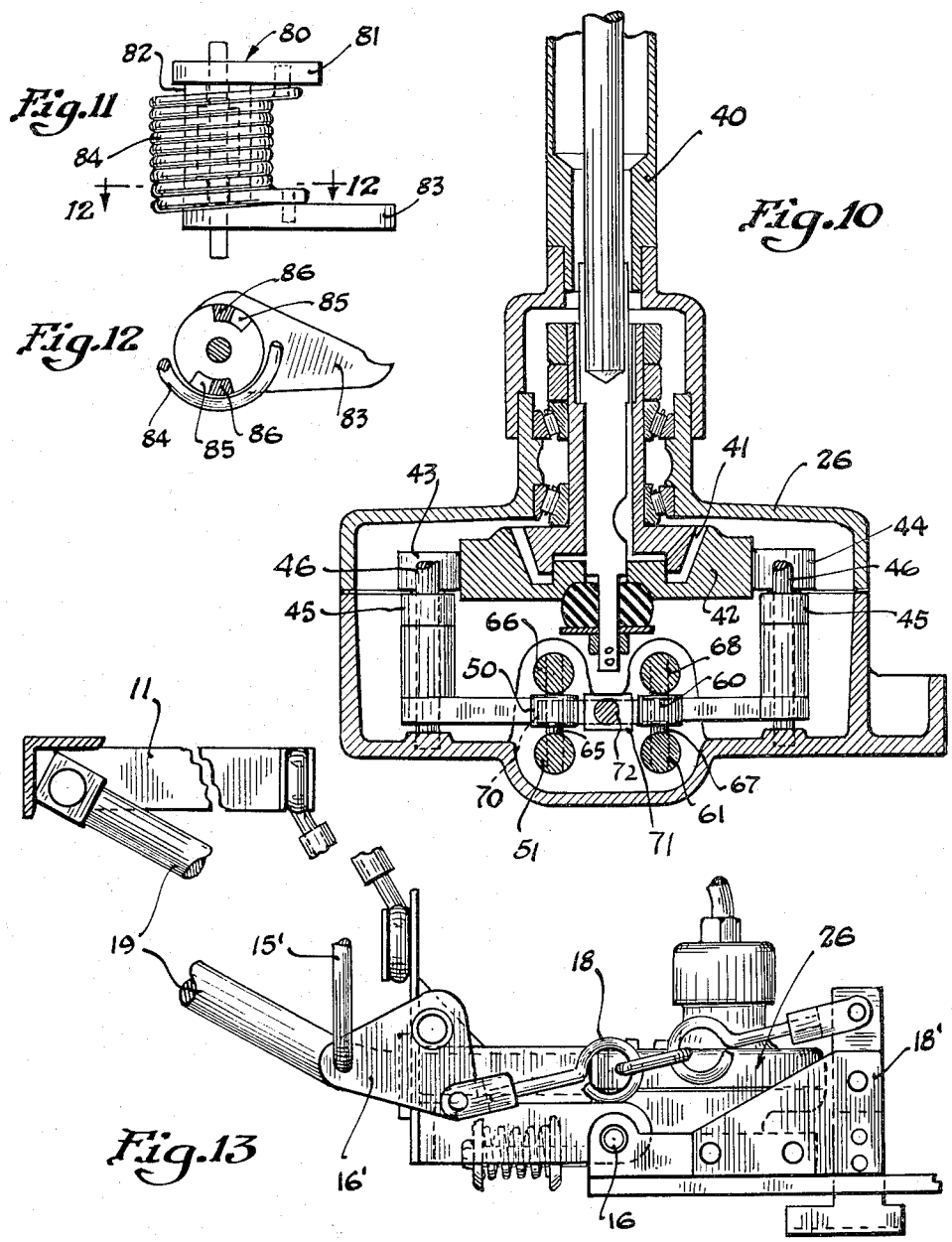

United States Patent Office 3,017,736
Patented Jan. 23, 1962

3,017,736
DOUBLE SICKLE MOWER CONSTRUCTION
George B. Hill, Mansfield, Ohio
(7615 Winterberry Place, Bethesda 14, Md.)
Original application Apr. 13, 1955, Ser. No. 501,107.
Divided and this application Feb. 2, 1959, Ser. No. 790,747
9 Claims. (Cl. 56—297)

This invention relates to agricultural machinery and more particularly to a double sickle mower means.

This application is a division of my copending application No. 501,107, filed April 13, 1955, now abandoned.

Double sickle mowers and certain of the advantages inherent in their use are well known and it is the purpose of this invention to provide an improved drive means for such a mower. Other objects of the invention are to provide structural improvements in the mower device including the specific arrangement of the knife sections, guards and stroke of the co-operating sickles. Further objects will appear in the specification below.

A preferred form of the invention is shown in the drawings wherein:

FIGURE 1 is a perspective view of the mower assembly;

FIGURE 2 is a detailed top plan view partly broken away showing the mower drive housing and the mounting of the mower on the frame;

FIGURE 3 is a top plan view partly broken away showing the cutting bar, sickles, knife sections and guard disposition;

FIGURE 4 is a top plan view partly broken away showing the bottom sickle;

FIGURE 5 is a top plan view partly broken away showing the top sickle;

FIGURE 6 is a view taken on line 6—6 of FIGURE 3;

FIGURE 7 is a view taken on line 7—7 of FIGURE 3;

FIGURE 8 is a top plan view of the double sickle drive means with the cover of the housing partly broken away;

FIGURE 9 is a view taken on line 9—9 of FIGURE 8;

FIGURE 10 is a view taken on line 10—10 of FIGURE 9;

FIGURE 11 is a detail view showing an alternate bell crank means for transmitting the driving motion from the cam drive to the sickle drive bars;

FIGURE 12 is a view taken on line 12—12 of FIGURE 11; and

FIGURE 13 is a view taken on line 13—13 of FIGURE 2 showing the linkages for tilting and raising and lowering the cutter bar.

Double sickle mower means have been proposed in the past and various drive means therefor are known. The present invention however provides a simplified and quite compact drive in the preferred form of which a constant acceleration and deceleration of the co-operating cutter bars is obtained in combination with a shortened stroke whereby to reduce the power required to drive such a mower to a minimum. This simplified drive feature coupled with a faster rate of reciprocation than is conventional in known mowers provides a drive and mowing means adapted to accomplish a much greater effective cutting action so that the mower of this design may be driven through the field to be cut at a much faster ground speed and yet obtain an equally good cutting pattern when compared with conventional mowers.

The mower of this invention, as will be evident from the description below, may be mounted in any manner to be conveniently reached from the power take-off of the tractor and a flexible drive means may be connected between the power take-off and the mower drive to transmit the driving force. Thus, the mower of this invention may be carried as a trail mower, or on a frame as a semi-mounted mower, or it may be a front side mounted mower and the flexible drive cable can be connected thereto in either of such positions. It is also suggested that the mower may be used on a combine or any harvester where conventional mowing means are now used.

Referring to the drawing for a more detailed description of this invention, the mower is shown as being semi-mounted on the draw bar of a tractor 10 by means of a conventional break-away frame 11. The mower extends laterally outwardly from frame 11 during normal mowing, but the frame is adapted to swing relatively rearwardly about a pivot 12 upon the release of latch 13 when the mower encounters an obstruction. The cutter bar is pivotally mounted to be raised and lowered through a vertical arc, and also in a manner to be adjustably tilted relative to the ground by a system of links and the spring counterbalanced lever 14 and turn buckle 15. All of this structure is well known.

For vertical lifting, the cutter bar assembly is pivoted on pins 16 carried on a horizontally disposed yoke frame 17 and the cutter bar assembly is raised by means of lever 14 and the connecting link means shown best in FIGURES 1 and 13. Thus when lever 14 is pulled toward the tractor, the rearwardly extending arm 14' is raised lifting link 15' with it, link 15' in turn rotates bell crank 16' to pull link 18. The link 18 is connected to the upstanding arm 18' integral with the cutter bar whereby it is raised.

The frame 17 is rotatably mounted on the relatively rigid drag bar 19 carried from frame 11 and turn buckle 15 is provided to adjustably rock frame 17 about its mounting on drag bar 19 to dispose the cutter bar at the desired angle and best level relative to the ground for cutting. A brace bar 20 may be connected between frame 11 and frame 17 to assist the drag bar in the support of the cutter bar assembly.

The cutter bar assembly includes the cutter bar 25 that is mounted on pivots 16 carried by frame 17. Fixedly mounted on cutter bar 25 as by being welded thereto is the housing 26 for the sickle bar drive means, and the two co-operating sickles 27 and 28 are carried for reciprocable motion on the front of cutter bar 25. A plurality of spaced pairs of guides 29 are supported on the cutter bar to form bearings for the sickle bars. As shown in FIGURE 7, in certain instances, a stone guard 30 may replace certain ones of the guides 29 of the several pairs.

The sickle bars 27 and 28 are each of the conventional length and are adapted to carry a plurality of two inch knife sections 31 fixed thereto, the tapered cutting edges being disposed so that a sharp shearing action results when the top and bottom sickles are moved relative to each other. Each sickle is adapted to be reciprocated simultaneously in a direction opposite to the movement of the other sickle through a stroke of one inch. Thus as the knife sections line up at the start of a cycle, they move into registry with the next adjacent knife section on the other sickle whereupon the reciprocable motion is reversed and the knife sections are returned to their original position of registry.

The reciprocation of each sickle bar is preferably accomplished with a constant rate of acceleration and deceleration and this feature of the invention is coupled with the relative short stroke of the sickle bars whereby to minimize the power required to drive the two sickle bars. In some cases another pattern of acceleration and deceleration may be found desirable but for most general application the smoother constant rate change is deemed more useful. It is apparent also that because of the balance accomplished by the use of the two oppositely reciprocating sickles, that less vibration is encountered and a smoother running machine is provided. All of these factors coupled with the reduced average velocity of the motion of the sickle bars due to the short stroke, further co-operate to somewhat minimize the driving power required to operate this mower.

In order to obtain the drive above described, the sickle bars are adapted to be driven from a cam drive disposed in housing 26. The construction of this drive mechanism is best seen in FIGURES 8 through 11, and referring to FIGURE 10, power is delivered through the flexible shaft 40 which transmits power through the friction clutch 41 to the three lobed cam 42. The lobes on cam 42 are preferably designed to drive the cam followers in a manner to produce a constant rate of acceleration and then deceleration as their motion is transmitted to the reciprocating sickles, and after the sickle has been driven outwardly by the cam, the sickle return means causes the cam follower to bear against the surface of the cam to produce a return stroke that is timed by the cam surface to have a constant rate of deceleration throughout the return stroke. It is to be understood that any shaped cam may be used but the above described shape is preferred.

Also referring to FIGURE 8, it will be seen that the cam is designed to have three lobes for driving the cam follower. This design makes it possible to take a direct drive from the 500 to 550 r.p.m. power take-off of a conventional tractor and yet get a speeded up oscillation of the sickle bar motion. With three lobes, as high as 1650 oscillations per minute can be obtained. The entirely enclosed drive means coupled with the elimination of gears or a V belt means to gear up the drive, as is the conventional practice, provides safety and improved maintenance factors not found in known prior art mowers, while at the same time simplifying the drive mechanism. There is no hazard by which a hand can be mangled and further the drive can be supplied with permanent lubrication.

As best seen in FIGURE 2, the drive mechanism is mounted integral with the cutter bar and the flexible shaft 40 permits the drive to be continued uninterruptedly while the cutter bar is pivoted upwardly about pins 16. The drive will continue without change through all angles even including a vertical disposition of the mower means. This result is achieved because of the compact design of the drive mechanism which permits it to be mounted on the inner end of the cutter bar so that the drive connections are always in line with the sickles.

Referring to FIGURES 8 and 9, the cam followers 43 and 44 are each carried in suitable bell cranks 45 pivotally mounted on the vertical shafts 46 to oscillate under the influence of the lobes of the cam as the cam is rotated. The opposite end of the bell crank 45 carrying the follower 43 is adapted to co-operate with a bearing means 50 carried on a shaft 51 which at its outer end is provided with a sickle drive nut 52 threaded onto the outer end of the shaft 51. The sickle drive nut is adapted to be removably attached to the inner end of the bottom sickle bar 27 to drive the bottom sickle bar as follower 43 is moved by the rotating cam.

The follower 44 similarly drives the opposite end of its bell crank lever 45 to engage bearing 60 carried by shaft 61, the outer end of which carries a sickle drive nut 62. The sickle drive nut 62 is adapted to be removably connected to the top sickle bar 28.

The bearing 50 on shaft 51 which co-operates with the bell crank 45 carrying follower 43, is mounted on a vertically disposed axis 65 carried at its lower end by shaft 51 and at its upper end by a reciprocably mounted stabilizer shaft 66. Similarly, bearing 60 is carried on a vertically disposed axis 67 carried between shaft 61 and a reciprocably mounted stabilizer shaft 68. The stabilizer shafts 66 and 68 extend through bearings in the end wall of the housing and are pinned to the sickle drive nuts 52 and 62 respectively.

Co-operating with the sides of bearings 50 and 60, opposite to the side engaged by the driving arms of bell cranks 45, is a floating T-shaped pivot 70 carried in the pivot support 71 which in one form of the invention is threaded onto shaft 72. The inner end of shaft 72 is provided with an adjustably positioned cap 73 adapted to trap spring 74 between the inner end of shaft 72 and the facing 75 on the inner side of housing 26. With this construction, it is seen that referring to FIGURE 8, as the cam 42 rotates in a clockwise direction, the follower 43 is driven over the peak of a cam lobe to drive its bell crank 45 to push bearing 50 outwardly to drive the bottom sickle bar outwardly. Simultaneously, the follower 44 is moving into the valley between two lobes along the rear face of the lobe which has just passed follower 44 and the T-shaped pivot 70 is driven by bearing 50 about its pivot support 71 so that bearing 60 is retracted to draw the top sickle inwardly. Upon further rotation of cam 42, the top cam is driven over the peak of a lobe and pivot 70 is oscillated to retract bearing 50 and the bottom sickle. The spring 74 is provided in order to produce just a little tension to normally hold followers 45 and 44 firmly against the surface of cam 42. This spring structure compensates for minor tolerances encountered in manufacture and serves the additional function of providing a yielding support for pivot 70 so that if either sickle becomes jammed, on its inward stroke, pivot 70 is in effect lifted to compress spring 74 to provide a safety release until the jam is cleared.

As above described, the leading and trailing edges of the lobes on cam 42 are designed to produce motion in each of the sickles so that they simultaneously reciprocate in opposite direction. Further, the preferred shape of the cams is such that the reciprocating motion starts out from zero and increases to a maximum with a constant rate of acceleration and upon reaching the peak, starts to decelerate with a constant rate of deceleration. This produces a motion which requires a minimum of power to effect movement of the parts and also the simultaneous reciprocation of the sickles in opposite directions makes for a balanced construction which effects substantial elimination of vibratory forces.

The friction clutch 41 is disposed between the flexible drive shaft 40 and the cam 42 as a further safety feature to prevent damage to the mower should the blades become jammed. It has been found, however, that due to the use of the spring arrangement including the spring 74 and the pivot head 70 for retracting the sickles, that should any jamming occur, the jammed sickle remains stationary and the spring 74 merely holds the sickle stationary until the next cam lobe engages the follower 43 or 44 to drive the jammed sickle outwardly. Normally this effects a clearance of the jammed mower and operation may be continued without any substantial slipping of clutch 41.

Referring to FIGURE 11, a structure may be provided which eliminates the necessity of inserting a safety clutch 41 and overload spring 74. In following this teaching, the bell crank 80 has a motion losing arrangement built into it. To accomplish this, the cam follower arm 81 has a generally vertically extending shaft 82 integral therewith and the lower, sickle drive arm 83 is pivoted to oscillate in a generally horizontal plane about the bearing for shaft 82 so that it may move relative to the shaft 82 under certain conditions. A relatively stiff coil spring 84 is disposed to surround the shaft 82, the spring being engaged at its opposite ends in the arms 81 and 83 respectively. The spring 84 tends to drive arm 83 in a counter clockwise direction relative to arm 81 as shown in FIGURE 12 such that the spring holds stop 85 integral with arm 83 tight against a stop 86 integral with shaft 82. The bell crank drive shown in FIGURES 11 and 12 is adapted to be used on the left hand side of the mechanism shown in FIGURE 10, and a similar but oppositely arranged bell crank drive may be provided for the right hand side drive.

Normally, during operation of the drive mechanism, the stiff spring 84 serves to hold stop 85 on arm 83 tightly against stop 86, but should one of the sickle bars become jammed, the arm 83 would be held relatively stationary while cam follower arm 81 would continue to be driven with the cam. As arm 81 is driven to the apex of the cam, the spring 84 permits relative movement to take place between the stalled drive arm 83 and cam follower arm 81. When the apex of the cam passes the cam follower, the arm 81 is returned toward its normal position relative to arm 83 by spring 84 until stop 86 engages stop 85 and then assuming the jam has cleared, the two arms of the bell crank shown in FIGURES 11 and 12 move in unison to drive the respective sickle with which it co-operates. It is obvious that spring 84 is designed to be so stiff that under normal driving conditions the bell crank drive shown in FIGURES 11 and 12 acts as a solid structure but when a jam occurs, as above explained, it permits the cam drive to continue running without damage to the mechanism, while the bell crank opens up, so to speak.

The clutch 41 may be eliminated when this alternate bell crank structure is used since the cam may be continuously driven without producing an undue load on any of the elements of the driving means. Also, spring 74 will no longer be needed as either bell crank 80 will give way to the cam if the sickles become jammed and no additional overload compensator is needed. In this instance, the T-shaped pivot 70 may be mounted to oscillate about a fixed pivot means 71 to effect a return drive of each sickle when the other sickle is being driven outwardly by the cam drive.

It should be noted that when either construction is used, that is the spring device 74 or the alternate bell crank 80 construction, that when a jam occurs, it is nearly always cleared when the direction of the sickle drive is reversed. In any event, however, if the jam is of a more permanent type, with either structure the drive mechanism is fully protected against the imposition of undue strains upon the parts thereof.

Referring particularly to FIGURES 4, 5, 8, and 9, an important advantage inherent in either form of the drive mechanism of this invention can be seen. Since the cam drive is so compact and arranged to be in-line with the sickle bars, a direct connection can be made between the sickles and their respective drive nuts 52 and 62. This eliminates the necessity for providing any kind of drive head arrangement so that when the knife sections have to be replaced, the sickle bars need only be unbolted from their drive nuts and then the sickles can be pulled lengthwise outwardly through their guide supports. The sickles may be withdrawn without interfering with the drive means. As seen in FIGURES 6 and 7, the sickle bars 27 and 28 can be pulled longitudinally outwardly through guides 29 as long as no cutter head is required and thus maintenance of the mower of this invention is simplified.

In certain instances where the mower is to be used in rocky soil, a plurality of stone guards 30 may be used and preferably such guards are spaced along the cutter bar on approximately three inch centers. This dimension is purposely selected in view of the one inch stroke of the sickle bars together with the two inch width of the knife sections. It is seen that with this arrangement, that at the opposite ends of the sickle bar motion, the knife sections will line up first with one stone guard and then at the other end of the stroke another pair of knife sections will line up with the next adjacent guard. Alternately, the space between the knife sections at the end of a stroke is covered by a stone guard and the next adjacent space is left open, at the other end of the stroke the next adjacent guard will cover a space and between the guards a space will be left open. Thus, alternately the relatively stationary stone guards cover the space between the knife sections and then cover up the overlapped teeth at the opposite ends of the sickle stroke. This permits more effective presentation of the mower to the crop being cut or, in other words, the guards are disposed in a manner such that while providing effective guarding action they cause a minimum of interference with the mower by way of covering openings between knife sections when the sickles reach the opposite ends of their stroke.

The operation of the mower mechanism described above should be fully understood from the description so far given. Briefly, the mower is attached to a tractor by any conventional means and referring to FIGURE 1, there is shown a semi-mounted mower arrangement. The mower is then connected to the power take-off of the tractor by means of the flexible shaft 40 which delivers power to the cam drive mechanism within housing 26. The cam 42 is then operative to drive the top and bottom sickle bars outwardly while pivot 70 driven by the reciprocating sickle drive bars, is adapted to return the sickle bars inwardly. Each of the sickle bars is timed to move in a direction opposite to that of the other bar and since the cycles are equal and opposite, the vibratory forces are substantially balanced out.

As above stated, the arrangement here shown may be mounted in any conventional manner on a tractor or other harvesting equipment. While the following claims define the invention, it is to be understood that modifications thereof may occur to those skilled in the art which will fall within the scope of the following claims.

I claim:

1. In a mower mechanism including supporting means for two oppositely reciprocating sickles adapted to be driven through a fixed drive and return cycle, a drive means therefor including a cam, means to rotate said cam, motion transmitting means operatively connected between said cam and said sickles to effect said reciprocation thereof in opposite directions, said motion transmitting means including a pair of cam followers co-operating respectively with said cam to be moved through said fixed sickle drive and return cycle and said followers co-operating respectively with each of said sickles to drive said sickles in one direction, a pivot means disposed to co-operate with both of said cam followers of said motion transmitting means, a pivot support therefor, said followers each co-operating with the cam in a manner such that one follower is being driven over a peak while the other follower is returning into a valley, and said pivot means being driven about its support by reason of its co-operation with the motion transmitting means that includes the cam follower that is being driven whereby said pivot serves to urge said other follower to return, the drive means functioning to positively move one sickle outwardly during the drive portion of said fixed cycle while the pivot means urges the other sickle inwardly during the return portion of said fixed cycle.

2. In a mower mechanism including supporting means for two oppositely reciprocating sickles adapted to be driven through a fixed drive return cycle, a drive means therefor including a cam, means to rotate said cam, said cam having complementary drive and return faces thereon, motion transmitting means operatively connected between said cam and said sickles to effect said reciprocation thereof in opposite directions, said motion transmitting means including a pair of cam followers co-operating respectively with said cam and one with each of said sickles to drive said sickles in one direction, a pivot means disposed to co-operate with both of said cam followers of said motion transmitting means, a pivot support therefor, said followers each co-operating with the cam in a manner such that one follower is being driven over a peak of the cam while the other follower may be returned into a valley simultaneously under the control of said complementary cam faces, and said pivot means being driven about its support by reason of its co-operation with the motion transmitting means that includes the cam follower that is being driven outwardly whereby said pivot serves to urge the motion transmitting means that includes said other follower to move inwardly toward the axis of the cam, said complementary faces being designed to give a constant rate of acceleration and deceleration to the movement of said reciprocating sickles, the drive means functioning to positively move one sickle outwardly during the drive portion of said fixed cycle while the pivot means urges the other sickle inwardly during the return portion of said fixed cycle.

3. In a mower mechanism including supporting means for two oppositely reciprocating sickles adapted to be driven through a fixed drive and return cycle, a drive means therefor including a cam, means to rotate said cam, motion transmitting means operatively connected between said cam and said sickles to effect said reciprocation thereof in opposite directions, said motion transmitting means including a pair of cam followers co-operating respectively with said cam and one with each of said sickles to drive said sickles in one direction, a pivot means disposed to co-operate with both cam followers of said motion transmitting means, a resiliently mounted pivot support therefor, said followers each co-operating with the cam in a manner such that one follower is being driven over a peak of the cam while the other follower may be returned into a valley simultaneously, and said pivot means being driven about its support by reason of its co-operation with the motion transmitting means that includes the cam follower that is being driven outwardly whereby said pivot serves to urge the motion transmitting means that includes said other follower to move inwardly toward the axis of the cam but may lift against said resilient mounting of its pivot support should a sickle become jammed, the drive means functioning to positively move one sickle outwardly during the drive portion of said fixed cycle while the pivot means urges the other sickle inwardly during the return portion of said fixed cycle.

4. In a mower mechanism including supporting means for two oppositely reciprocating sickles adapted to be driven through a fixed drive and return cycle, a drive means therefor including a cam, means to rotate said cam, motion transmitting means operatively connected between said cam and said sickles to effect said reciprocation thereof in opposite directions, a Y-shaped yoke fixed to each of said sickles, a bearing means carried between the arms of the Y, said motion transmitting means including a pair of oscillatably mounted bell cranks, said bell cranks constructed with cam followers being mounted on one arm of each of the bell cranks, the other arm of each of the bell cranks being adapted to engage said bearing means of each of said yokes respectively, each of said bell cranks co-operating respectively with said cam and one with each of said sickles to drive said sickles in one direction, a pivot means disposed to co-operate with both of said cam followers of said motion transmitting means, a pivot support therefor, said followers each co-operating with the came in a manner such that one follower is being driven over a peak of the cam while the other follower may be returned into a valley simultaneously, and said pivot means being driven about its support by reason of its co-operation with the motion transmitting means that includes the cam follower that is being driven outwardly whereby said pivot serves to urge the motion transmitting means that includes said other follower to move inwardly toward the axis of the cam, the drive means functioning to positively move one sickle outwardly during the drive portion of said fixed cycle while the pivot means urges the other sickle inwardly during the return portion of said fixed cycle.

5. In a mower mechanism including supporting means for two oppositely reciprocating sickles adapted to be driven through a fixed drive and return cycle, a drive means therefor including a cam, means to rotate said cam, motion transmitting means operatively connected between said cam and said sickles to effect reciprocation thereof in opposite directions, said motion transmitting means including a pair of bell crank means each having cam followers on one of their arms for co-operating respectively with said cam and the other arm respectively with each of said sickles to drive said sickles in one direction, a pivot means disposed to co-operate with both of said cam followers of said motion transmitting means, a pivot support therefor, said followers each co-operating with the cam in a manner such that one follower is being driven over a peak of the cam while the other follower may be returned into a valley simultaneously, and said pivot means driven about its support by reason of its co-operation with the motion transmitting means that includes the cam follower that is being driven outwardly whereby said pivot serves to urge the motion transmitting means that includes said other follower to move inwardly toward the axis of the cam, each of said bell crank means having a pair of arms normally disposed at a fixed angle with respect to each other, resilient means to hold said arms in said normal disposition but permitting said arms to move relative one to another when an unusual load is encountered, the drive means functioning to positively move one sickle outwardly during the drive portion of said fixed cycle while the pivot means urges the other sickle inwardly adapted to be driven through a fixed drive and return.

6. In a drive means for a mower having two reciprocating sickle means, or the like, adapted to be driven through a fixed drive and return cycle, a cam drive means to effect simultaneous reciprocation of each of said sickles in opposite directions, a means to transmit motion from said cam to said sickles, said transmitting means including a bell crank having arms extending outwardly in a fixed relation from a common axis, said arms being mounted to normally move as a unit about said axis, relatively stiff resilient means to hold said arms in said fixed relation but being adapted to permit said arms to spread apart against the resiliency of said holding means to discontinue the transmission of said motion when a jam occurs.

7. A mower having two reciprocating sickle means, a cam drive means to effect simultaneous reciprocation of each of said sickles in opposite directions, a means to transmit motion from said cam to said sickles, said transmitting means including a bell crank having two arms, a bearing shaft for supporting said arms, said bearing shaft being supported to oscillate about an axis, said arms being mounted on said shaft with at least one arm being rotatable with respect thereto, co-operating stop means on said shaft and said rotatably mounted arm, relatively stiff resilient means to normally hold said stop in engagement whereby said bell crank may normally oscillate as a unit about said axis, but said resilient holding means being adapted to permit said arms to spread apart against the resiliency of said holding means to discontinue the transmission of said motion when a jam occurs.

8. A mower having two reciprocating sickle means, a cam drive means to effect simultaneous reciprocation of each of said sickles in opposite directions, a means to transport motion from said cam to said sickles, said transmitting means including a bell crank having arms extending outwardly in a fixed relation from a common axis, said arms being mounted to normally move as a unit about said axis, relatively stiff resilient means to hold said arms in said fixed relation but being adapted to permit said arms to spread apart against the resiliency of said holding means to discontinue the transmission of said motion when a jam occurs, one of said arms having a bearing on the cam and the other of said arms being drivingly connected to one of siad sickle means.

9. A mower having two reciprocating sickle means, a cam drive means to effect simultaneous reciprocation of each of said sickles in opposite directions, a means to transmit motion from said cam to said sickles, said transmitting means including a pair of bell crank means each having two arms extending outwardly in a fixed relation from their individual bearing shafts, each of said shafts being adapted to oscillate about their respective axes, said arms of each of said bell crank means being mounted to normally move as a unit about their respective axes, a pair of relatively stiff resilient means associated one with each of said bell cranks to hold said arms in said fixed relation but being adapted to permit said arms to spread apart against the resiliency of said holding means to discontinue the transmission of said motion when a jam occurs.

References Cited in the file of this patent

UNITED STATES PATENTS

| | | |
|---|---|---|
| 2,023,029 | Palmer | Dec. 3, 1935 |
| 2,364,039 | Varga | Nov. 28, 1944 |
| 2,558,679 | Gressel et al. | June 26, 1951 |
| 2,641,894 | McShane | June 16, 1953 |
| 2,662,358 | Tanke | Dec. 15, 1953 |
| 2,663,133 | Davis | Dec. 22, 1953 |
| 2,664,690 | Huddle et al. | Jan. 5, 1954 |